United States Patent
Schmidt et al.

(10) Patent No.: US 7,483,642 B2
(45) Date of Patent: Jan. 27, 2009

(54) RECEIVER FOR OTDM/PDM OPTICAL SIGNALS

(75) Inventors: Michael Schmidt, Stuttgart (DE); Eugen Lach, Marbach (DE)

(73) Assignee: Alcatel, Paris (FR)

( * ) Notice: Subject to any disclaimer, the term of this patent is extended or adjusted under 35 U.S.C. 154(b) by 803 days.

(21) Appl. No.: 10/697,120

(22) Filed: Oct. 31, 2003

(65) Prior Publication Data

US 2004/0100695 A1 May 27, 2004

(30) Foreign Application Priority Data

Nov. 27, 2002 (EP) .................................. 02360328

(51) Int. Cl.
*H04B 10/06* (2006.01)

(52) U.S. Cl. .................. 398/207; 398/202; 398/205; 398/206; 398/208; 398/209; 398/212; 398/213; 398/214; 398/184; 398/65; 398/75; 398/102; 398/161; 398/152; 398/98; 359/495; 359/483; 359/246; 385/1; 385/4; 385/11; 385/24

(58) Field of Classification Search ............... 398/202, 398/205, 206, 207, 208, 209, 212, 213, 214, 398/184, 152, 161, 65, 75, 98, 101, 102; 359/495, 483, 246; 385/1, 4, 11, 24

See application file for complete search history.

(56) References Cited

U.S. PATENT DOCUMENTS 7,067,795 B1 * 6/2006 Yan et al. ..................... 250/225

2002/0196497 A1 * 12/2002 LoCascio et al. ............ 359/135

OTHER PUBLICATIONS

Widdowson T et al: "Polarisation guiding in ultralong distance solition transmission" Electronics Letters, IEE Stevenage, GB, bol. 30, No. 11, May 26, 1994, pp. 879-880, XP006000611.
Leguen D et al.: "Demonstration of Sliding-Filter-Controlled Soliton transmission at 20 Gbit/s over 14 Mm" Electronics Letters, IEE Stevange, GB, vol. 31, No. 4, Feb. 16, 1995, pp. 301-302, XP006002481.
Heismann F et al: "Automatic Polarization Demultiplexer for Polarization-Multiplexed Transmission Systems" Proceedings of the European Conference on Optical Communication (ECOC) Montreux, Sep. 12-16, 1993, Regular Papgers, Surich, Sev, Ch., vol. 2. Snof. 19, Sep. 12, 1993, pp. 401-404, XP000492247.
Iwatsuki K et al: "80GB/S Optical Soliton Transmission Over 80KM with Time/Polarization Division Multiplexing" Proceedings of the European Conference on Optical Communication (ECOC) Post Deadline Papers. Berlin, Sep. 27-Oct. 1, 1992. Bound as one with vols. 1 & 2, Frankfurt, IGVDE, DE, vol. 3, Conf. 18, Sep. 27, 1992, pp. 851-854, XP000559172.

* cited by examiner

*Primary Examiner*—Hanh Phan
(74) *Attorney, Agent, or Firm*—Sughrue Mion, PLLC

(57) ABSTRACT

A receiver for an OTDM/PDM pulse train (10) in which the pulses (12) have alternating polarizations (P1, P2) has a polarization insensitive optical switch (16; 161, 162, 163, 164) for isolating optical pulses (10') within the pulse train (10), and a polarization selective element (17) for separating from the isolated pulses (10') at least one component that has a single polarization. This allows to considerable relax the constraints posed on the switch since components in the isolated pulses that result from interchannel interference can, at least to a large extent, be eliminated by the subsequent polarization selective element (17).

9 Claims, 2 Drawing Sheets

RECEIVER FOR OTDM/PDM OPTICAL SIGNALS

BACKGROUND OF THE INVENTION

The invention is based on a priority application EP 02 360 328.5 which is hereby incorporated by reference.

The present invention relates to a receiver for an optical time-division multiplexed (OTDM) pulse train in which the pulses have alternating polarizations. The invention further relates to a method for receiving such an OTDM pulse train.

In typical OTDM systems, an optical pulse source on the transmitter side generates a pulse train with a channel bit rate $B_C$ that equals the base rate of electronic data streams fed to the OTDM system. This optical pulse train is coupled into n optical branches in which modulators are driven by the electrical data streams. Each modulator imprints the incoming data stream on the pulse train, thereby generating an optical data signal with the channel bit rate $B_C$. The n optical data signals, which represent n different channels, are interleaved by a delay-line multiplexer on a bit-by-bit basis (bit interleaving TDM) or on a packet-by-packet basis (packet interleaving TDM). The multiplexer generates a multiplexed optical data signal with a multiplex bit rate $B_M = n \times B_C$. The multiplexed signal is then launched into a transmission medium, for example a single-mode optical fiber.

On a receiver side, an optical demultiplexer usually de-interleaves the channels, because electronic devices are not capable of directly processing signals with bit rates $B_M$. The demultiplexed signals with the channel bit rate $B_C$ are finally reconverted by opto-electronic devices into electric signals for further processing.

In ultra-high-speed OTDM transmission systems having bit rates of more than 40 Gbit/s, pulse durations are extremely short. For a 160-Gbit/s system, for example, the time slot for a single bit is only 6.25 ps wide. As OTDM transmission systems have to use return to zero (RZ) pulses, i.e. pulses that return to zero power level within each time slot, the width of a pulse in ultra-high-speed OTDM transmission systems is even shorter, namely about one half of the time slot width.

Such extremely short pulse durations pose very high demands on the demultiplexers that are one of the key components of an OTDM receiver. Demultiplexers that are capable of separating pulses in ultra-high bit rate optical transmission systems require very short switching windows and a high extinction ratio.

One approach that has been proposed to facilitate the separation of pulses in OTDM pulse trains is to combine optical time-division with polarization-division multiplexing. Optical polarization-division multiplexing (PDM) is a type of optical multiplexing that multiplexes several polarized optical pulse trains having different polarizations into single optical pulse train. Usually two pulse trains with orthogonal polarizations are bit interleaved such that the polarizations of the pulses of the resulting pulse train alternate.

Standard single-mode optical fibers support PDM because two orthogonal states of polarization can exist in the fundamental mode of such fibers. The relative orthogonal nature of the polarization is preserved in the fibers although the state of polarization (SOP) of the optical pulse trains is randomized as the pulse train propagates through the fiber. This assumes that polarization effects, such as polarization mode dispersion (PMD) and polarization-dependent loss (PDL), are not significant enough to destroy the orthogonal nature of the polarization in the polarized pulse trains.

On the receiver side a polarization controller usually transforms the fluctuating polarizations of the pulse trains into a stable state of polarization (SOP). The polarization controller is often part of control feedback loop in which a portion of the output signal of the polarization controller is tapped off. This portion is transformed by a photodetector into an electrical signal from which a control unit derives a control signal for the polarization controller. Once a stable SOP is recovered, polarization-sensitive optical components, for example a polarization beam splitter, can be used to separate the pulse trains so that an OTDM demultiplexer and photoelectric detectors may reconstruct from the pulse trains the data stream that has been imprinted thereon on the transmitter side.

In ultra-high bit rate OTDM/PDM transmission systems, the successive pulses with alternating polarizations partly overlap. Polarization mode dispersion (PMD) that tends to depolarize the pulses then poses considerable problems, since successive pulses may, when they propagate along the fiber, partly interfere although they had originally orthogonal polarizations. This interchannel interference causes leakage signals (also referred to as noise or simply interference signals) that increases the bit error rate (BER) of the optical transmission system.

From a paper entitled "Polarization Multiplexed 2×20 Gbit/s RZ Transmission using Interference Detection" by S. Hinz et al., currently published in the Internet at http://ont.uni-paderborn.de/publikationen/25372.pdf, it is known to reduce the bit error rate by refining the polarization control at the input side of the receiver. To this end, a sinusoidal frequency modulation is applied to a laser source of the transmitter for generating an interchannel phase modulation. At the receiver side, an interchannel interference signal is detected in the feedback control loop of the polarization controller and then digitally processed so as to obtain a Bessel spectrum thereof. By suitable weighing certain lines of this Bessel spectrum, a control signal for the polarization controller is derived that is independent of the mean interchannel phase difference. The output of the polarization controller is fed to a polarizer and then to an OTDM demultiplexer.

However, the rather complex algorithm that is used in this approach for deriving the control signal from the interference signal requires considerable digital processing power. Further, a frequency modulation has to be applied to the laser source of the transmitter which further increases overall system costs and might impair system performance.

It is, therefore, an object of the present invention to provide a receiver for an optical time-division multiplexed pulse train as mentioned at the outset with reduced system complexity.

SUMMARY OF THE INVENTION

According to the invention, this object is achieved, with the receiver as mentioned at the outset, in that the receiver comprises a polarization insensitive optical switch for isolating optical pulses within the pulse train, and a polarization selective element for separating from the isolated pulses at least one component that has a single polarization.

By first isolating optical pulses and then separating the pulses of different polarizations by a polarization selective element, the conventional order of demultiplexing first in the polarization domain and then in the time domain is reversed. This allows to considerable relax the constraints posed on the OTDM demultiplexer since components in the isolated pulses that result from interchannel interference can, at least to a large extent, be eliminated by the subsequent polarization selective element. To be more specific, a demultiplexer may be used in the new receiver whose switching window, i.e. the time interval during which the an optical signal is passed to an output, is increased if compared to conventional systems. Further, the extinction ratio of the demultiplexer may also be reduced so that less complex devices can be used.

The polarization insensitive optical switch may be any device or demultiplexer that allows to isolate single pulses from a pulse train irrespective of their polarization. Thus the switch can, for example, be realized as an electro-optic modulator such as a Mach-Zehnder interferometric modulator or an electro-absorption modulator.

The polarization selective element may be any device that allows to separate from an optical pulse at least one component that has a single polarization. Thus the polarization selective element can be a polarizer if only one component shall be isolated from the pulse for further use. If a separation into two or more components is required, a polarization beam splitter can be used having a first output port and a second output port, wherein the first output port emits a first component of the isolated pulses having a first polarization, and the second output port emits a second component of the isolated pulses having a second polarization that is distinct from the first polarization.

A polarization controller may be dispensed with in the new receiver if an optical waveguide is used as transmission line that maintains not only the orthogonal nature of the pulse trains but also the state of polarization as such.

However, in general it will be necessary to use a polarization controller for altering the polarization of the isolated pulses, the polarization controller being disposed between the optical switch and the polarization selective element. The polarization controller allows to transform the polarization of the isolated pulses in such a way that all pulses have a defined polarization before they enter the polarization selective element. The latter can then remove those components from the pulses that result from interchannel interference so that crosstalk of adjacent channels is reduced. The quantitative contribution of these components to the isolated pulses depends mainly on the switching characteristics of the optical switch, particularly on the width of the switching window and the extinction ratio.

If a beam splitter is used as polarization selective element, it is further preferred if its first output port is connected to a pulse detector for extracting digital information, and its second output port is connected to a power detector that forms, together with the polarization controller and the polarization beam splitter, a control feedback loop for controlling the polarization controller. This simple arrangement allows to control the polarization controller merely by measuring the optical power of the separated noise components at the power detector. Feedback control can then, for example, be achieved by minimizing the optical power of the noise components that are coupled out of the second output port of the polarization beam splitter. The power detector may be a slow photodiode because only the mean power of the noise components is required for controlling the polarization controller. This mean value is subject only to slow fluctuations due to polarization drifts.

A new method for receiving OTDM/PDM pulse trains that makes use of the receiver as described above is subject of claims 6 to 9.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

The above and other advantages and features of the present invention will become apparent from the following description of the preferred embodiments given in conjunction with the accompanying drawings, in which:

FIG. 1 shows a combined OTDM/PDM pulse train 10 with pulses 12 propagating in time t along an optical fiber. Each pulse 12 is transmitted in an OTDM time slot $S_{ik}$ that is assigned to one of four channels CH1, CH2, CH3 and CH4. In the example shown, time slots $S_{11}$, $S_{12}$, $S_{13}$ and $S_{14}$ are assigned to channel CH1, time slots $S_{21}$, $S_{22}$, $S_{23}$ and $S_{24}$ are assigned to channel CH2 and so on. Optical pulses 12 in channel CH1 and channel CH3 are transmitted with a first polarization P1, and pulses in channel CH2 and channel CH4 are transmitted with a second polarization P2 that is orthogonal to polarization P1. Thus pulses in successive time slots have alternating polarizations so that pulse train 10 is a combined time-division and polarization-division multiplexed optical signal. For achieving higher transmission capacity pulses 12 in pulse train partly overlap in the time domain, as can be seen in FIG. 1.

FIG. 2 shows a block diagram of a receiver 14 for receiving channel CH1 of pulse train 10. Receiver 14 comprises an input port $P_i$, an intermediate output port $P_{o2}$, a polarization insensitive optical switch 16 for isolating optical pulses 12 within pulse train 10, and a polarization selective element 17 for separating from the isolated pulses at least one component that has a single polarization.

The function of receiver 14 is now explained with reference to FIGS. 3 and 4.

Figure 1:
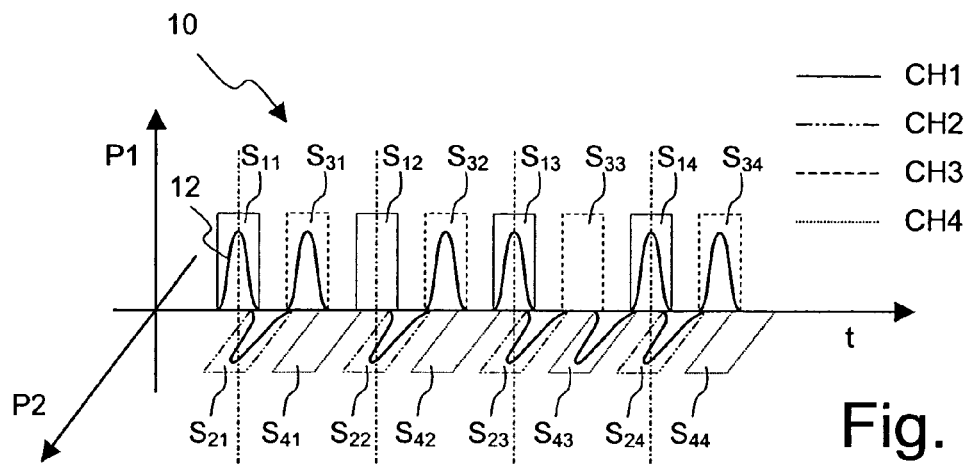
FIG. 1 shows an OTDM/PDM pulse train in which the pulses have alternating polarizations.
Figure 3:
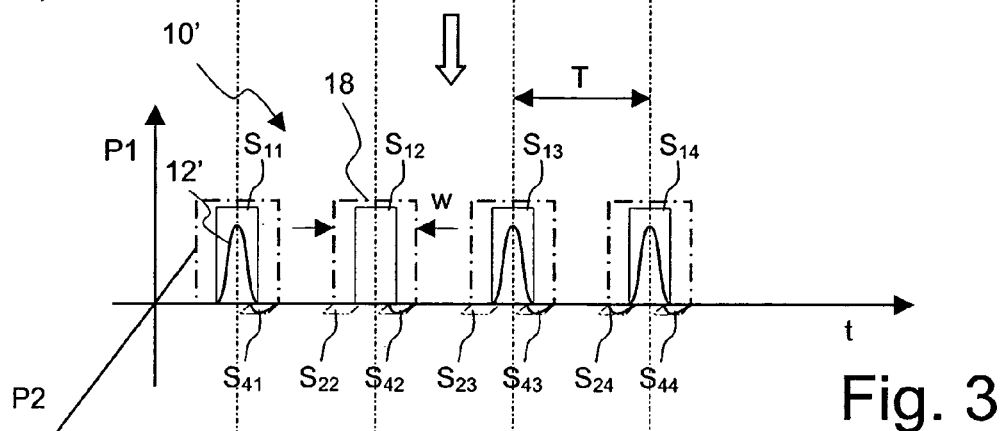
FIG. 3 shows a pulse train at the output of an optical switch contained within the receiver of FIG. 2.
Figure 4:
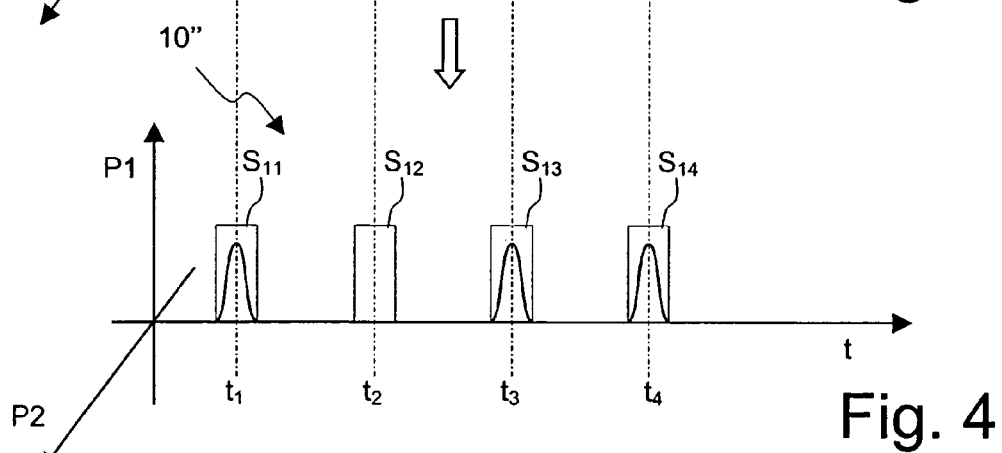
FIG. 4 shows a pulse train at the output of a polarization selective element contained within the receiver of FIG. 2.
Figure 2:
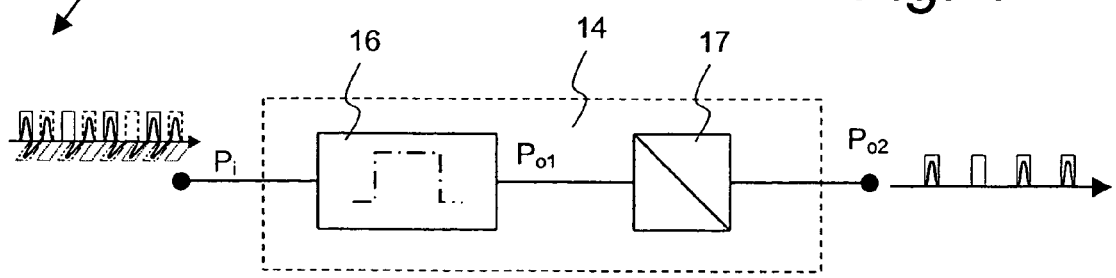
FIG. 2 shows a block diagram for a first embodiment of a receiver according to the present invention.

FIG. 3 shows a pulse train 10' as generated by optical switch 16 at an output $P_{o1}$ thereof. As can be seen, pulses 12' in time slots assigned to channel CH1 have been isolated from original pulse train 10 by optical switch 16. To this end, optical switch 16 opens in regular intervals of length T where T is equals the time interval between two successive time slots $S_{1n}$ and $S_{1n+1}$ of channel CH1. The time interval, during which optical switch 16 is open so that optical signals can pass, is referred to as switching window and indicated by 18. The temporal width w of switching window 18 determines to which extent pulses adjacent to the pulse to be isolated contribute to a signal at output $P_{o1}$ of optical switch 16. In the embodiment shown in FIGS. 1 to 4, width w of switching window 18 is chosen so that it extends over more than one time slot $S_{ik}$. This is advantageous because optical switches with broader switching windows are cheaper and easier to handle.

Since optical switch 16 is polarization insensitive, it does not only pass pulses from the desired time slots in its open state, but also pulse components from pulses in adjacent time slots. For example, at time $t_4$ not only the pulse in time slot $S_{14}$ but also pulse components from time slots $S_{24}$ and $S_{43}$ contribute to the signal at output $P_{o1}$. These contributions cause interchannel cross-talk and increases the bit error rate (BER) of the transmission system. However, as can be seen in FIG. 3, these contributions differ with respect to their polarization from the pulse in time slot $S_{14}$.

In order to remove contributions of adjacent time slots, the signal at output $P_{o1}$ is fed to polarization selective element 17. The latter separates from the isolated pulses 12' in pulse train 10' all components having the polarization P1, i.e. the polarization of the pulse in time slot $S_{14}$. Signals with polarizations other than P1 are rejected. Thus, at intermediate output port $P_{o2}$, a pulse train 10" can be coupled out in which all contributions from interchannel interference are removed. This pulse train 10", as is shown in FIG. 4, represents channel CH1 and may now be further processed, for example by using an opto-electronic converter such as a photodiode.

Figure 5:
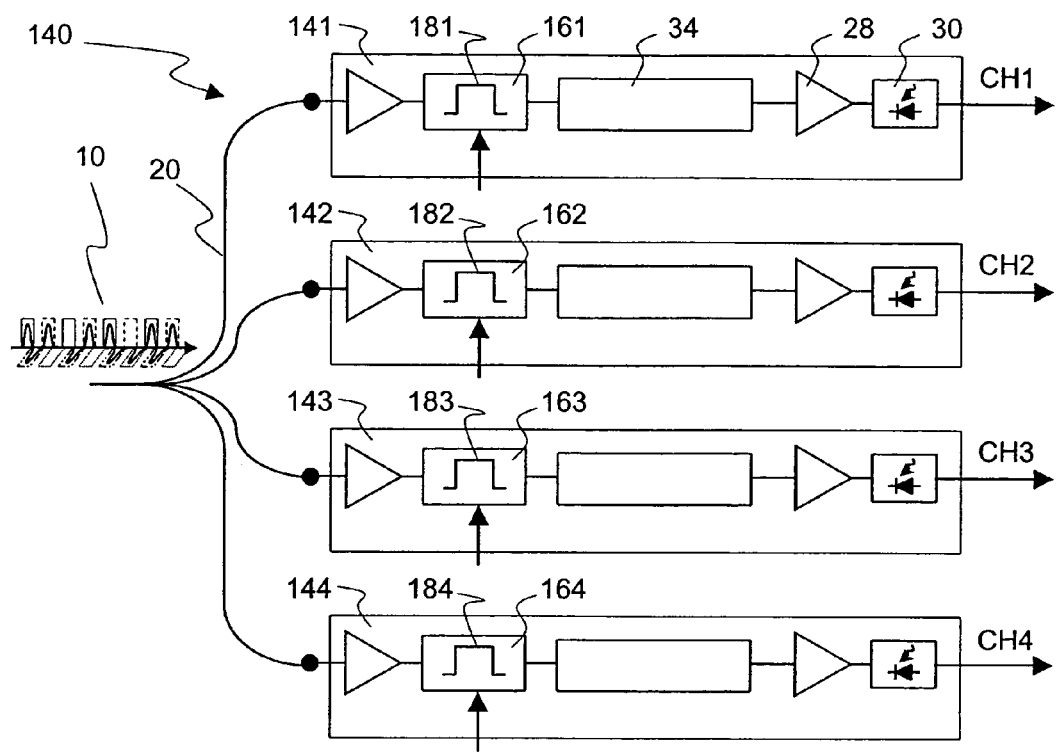
FIG. 5 shows a block diagram of another embodiment of a receiver according to the present invention in which the receiver comprises four one channel receiver units.

FIG. 5 shows a block diagram of another embodiment of a receiver that is indicated in its entirety by 140 and comprises four receiver units 141, 142, 143 and 144 which are described in detail below. Each receiver unit is provided for receiving one of four channels CH1 . . . CH4. To this end, receiver units 141, 142, 143 and 144 are coupled to a fiber splitter 20 that distributes pulse train 10 to all receiver units 141, 142, 143 and 144. Receiver units 141, 142, 143 and 144 have different relative positions of their switching window with respect to the time slots $S_{ik}$ in pulse train 10. Particularly, receiver unit 141 has an optical switch 161 with a switching window 181 for passing time slots in channel CH1, i.e. time slots $S_{11}$, $S_{12}$, $S_{13}$, $S_{14}$. Receiver unit 142 has an optical switch 162 with switching window 182 for passing time slots in channel CH2, i.e. time slots $S_{21}$, $S_{22}$, $S_{23}$, $S_{24}$, and so on. Thus each receiver unit provides an output for one OTDM channel as indicated in FIG. 5.

Figure 6:
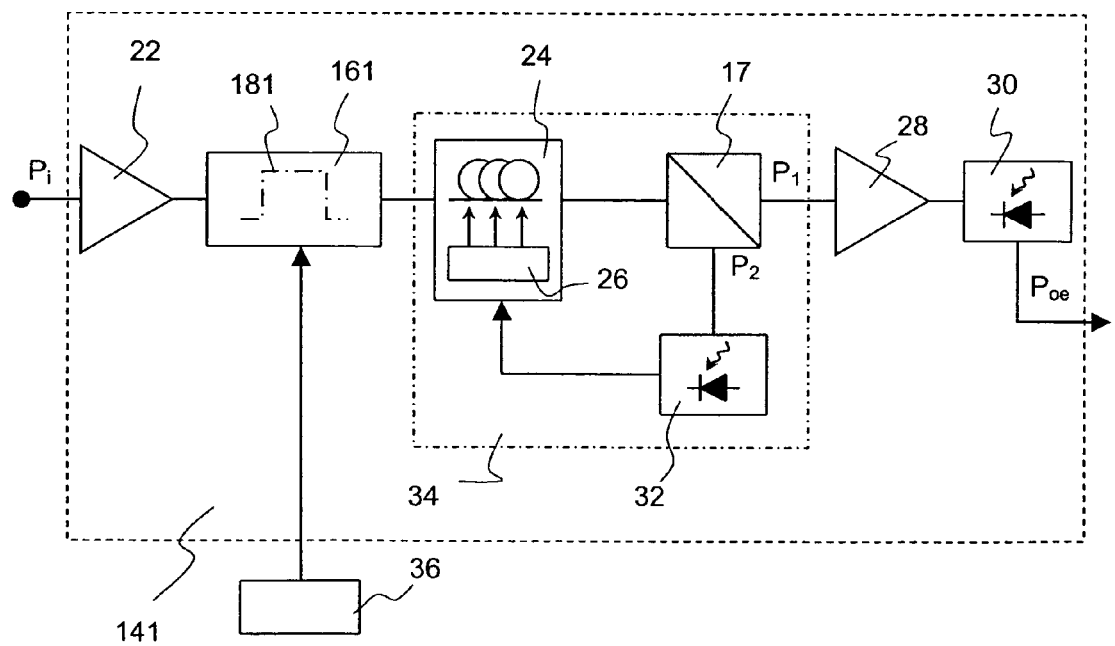
FIG. 6 shows a more detailed block diagram of a receiver unit of the embodiment shown in FIG. 5.

The layout and function of the receiver units 141, 142, 143 and 144 will now be described exemplarily for receiver unit 141 with reference to FIG. 6. It is to be understood that the other three receiver units 142, 143 and 144 have substantially the same layout and function as receiver unit 141.

Receiver unit 141 has an optical pre-amplifier 22 that is coupled to an input port $P_i$ of receiver unit 141. Optical pre-amplifier 22 may be an erbium doped fiber amplifier (EDFA), for example. Such optical pre-amplifiers in each receiver unit 141, 142, 143 and 144 could also be replaced by a common optical pre-amplifier with higher output power that is provided in front of splitter 20. Optical amplifier 22 is connected to an optical switch 161 having a switching window 181, and optical switch 161 is connected to a polarization controller 24. Polarization controller 24 allows to transform the polarization of an optical signal in a controllable manner. For example, polarization controller 24 may allow to rotate the polarization of a linearly polarized signal by an angle that can be controlled by a control unit 26. Polarization controller 24 may be realized as a group of cascaded endlessly rotatable optical retardation plates, as is known in the art as such.

Polarization controller 24 is coupled to a polarization beam splitter 17 having a first output port $P_1$ and a second output port $P_2$. First output port $P_1$ emits optical signals having a first polarization, and second output port $P_2$ emits optical signals having a second polarization that is distinct from the first polarization. First output port $P_1$ is coupled via amplifier 28 to a pulse detector 30, for example an conventional intensity modulated opto-electronic converter in the form of a fast photodiode. Pulse detector 30 converts optical signals into electrical signals.

Second output port $P_2$ of polarization beam splitter 17 is connected to a power detector 32 that may be realized as a slow photodiode. Power detector 32 measures the optical intensity at output port $P_2$. The electrical output of power detector 32 is connected to control unit 26 of polarization controller 24.

Optical switch 161 is coupled to a central clock recovery module 36 that is connected (not shown) to one of the pulse detectors 30 from which it extracts a clock signal. Optical switch 161 can then, as is known in the art as such, be synchronized such that an arbitrary OTDM channel can be isolated from the incoming pulse train.

The function of receiving unit 141 is as follows:
If a pulse train 10 comprising pulses with alternate orthogonal polarizations is coupled into input port $P_i$, it is pre-amplified by pre-amplifier 22 and then the fed to optical switch 161. Optical switch 161 generates an OTDM demultiplexed pulse train as principally shown in FIG. 3. This pulse train, which may contain contributions of adjacent time slots having the orthogonal polarization, is fed to polarization controller 24 that transforms the polarization of the pulses to such a degree that the pulses of the desired channel can pass polarization beam splitter 17 via its output port $P_1$. The interchannel contributions that are contained in the signal and have an orthogonal polarization, are separated form the signal and coupled to output port $P_2$ of polarization beam splitter 17.

In order to determine the degree to which the polarizations of the pulses has to be transformed, polarization controller 24, polarization beam splitter 17 and power detector 32 form a feedback loop 34 for adaptive polarization control. The feedback parameters are chosen such that the polarization controller 24 attempts to minimize the optical intensity at power detector 32. This is advantageous since minimizing the optical intensity at output port $P_2$ is more sensitive to polarization drifts than maximizing the intensity at output port $P_1$.

The demultiplexed pulse train passing output port $P_1$ of polarization beam splitter 17 is amplified by amplifier 28 and conventionally converted into an electrical signal by pulse detector 30. This electrical signal can be tapped off at electrical output port $P_{oe}$.

The invention claimed is:

1. A receiver for an optical time division multiplexed pulse train in which the pulses have alternating polarizations, the receiver comprising:
   a) a polarization insensitive optical switch for isolating optical pulses within the pulse train, and
   b) a polarization selective element for separating from the isolated pulses at least one component that has a single polarization.

2. The receiver of claim 1, further comprising a polarization controller for altering the polarization of the isolated pulses, the polarization controller being disposed between the optical switch and the polarization selective element.

3. The receiver of claim 2, wherein the polarization selective element is a polarization beam splitter having a first output port and a second output port, wherein the first output port emits a first component of the isolated pulses having a first polarization, and the second output port emits a second component of the isolated pulses having a second polarization that is distinct from the first polarization.

4. The receiver of claim 3, wherein the first output port is connected to a pulse detector for extracting digital information, and the second output port is connected to a power detector that forms, together with the polarization controller and the polarization beam splitter, a control feedback loop for controlling the polarization controller.

5. The receiver of claim 4, further comprising a clock recovery module that is connected to the pulse detector for extracting a clock signal to be fed to the optical switch.

6. A method for receiving an optical time division multiplexed pulse train in which the pulses have alternating polarizations, the method comprising the steps of:
   a) isolating optical pulses from the pulse train by a polarization insensitive optical switch, and
   b) separating from the isolated pulses at least one component that has a single polarization.

7. The method of claim 6, wherein the polarizations of the isolated pulses are altered by a polarization controller before the isolated pulses are separated into components having a single polarization.

8. The method of claim 6, wherein a first and a second component having different polarizations are separated from the isolated pulses, wherein the first component is used for extracting digital information and the second component is used for controlling the polarization controller in a control feedback loop.

9. The method of claim 8, wherein the polarization controller is controlled by the control feedback loop such that the optical power of the second component is minimal.

* * * * *